United States Patent
Weller et al.

(10) Patent No.: US 11,597,658 B2
(45) Date of Patent: Mar. 7, 2023

(54) PREPARATION OF NANOSIZED CUBIC LITHIUM LANTHANUM ZIRCONATE FAST ION CONDUCTOR VIA FACILE POLYMER-CHELATE COMBUSTION ROUTE

(71) Applicants: Jon Mark Weller, Phoenix, AZ (US); Candace Chan, Phoenix, AZ (US)

(72) Inventors: Jon Mark Weller, Phoenix, AZ (US); Candace Chan, Phoenix, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 0 days.

(21) Appl. No.: 17/112,228

(22) Filed: Dec. 4, 2020

(65) Prior Publication Data
US 2021/0230013 A1 Jul. 29, 2021

Related U.S. Application Data

(63) Continuation of application No. 16/009,518, filed on Jun. 15, 2018, now Pat. No. 10,858,263.

(60) Provisional application No. 62/521,051, filed on Jun. 16, 2017.

(51) Int. Cl.
| | |
|---|---|
| H01M 4/485 | (2010.01) |
| B82Y 40/00 | (2011.01) |
| C01G 25/00 | (2006.01) |
| H01M 10/0562 | (2010.01) |

(52) U.S. Cl.
CPC .......... *C01G 25/006* (2013.01); *H01M 4/485* (2013.01); *C01P 2002/52* (2013.01); *C01P 2002/72* (2013.01); *C01P 2002/74* (2013.01); *C01P 2002/76* (2013.01); *C01P 2004/03* (2013.01); *C01P 2004/04* (2013.01); *C01P 2006/40* (2013.01); *C01P 2006/80* (2013.01); *H01M 10/0562* (2013.01); *H01M 2300/0071* (2013.01)

(58) Field of Classification Search
CPC ..... H01M 10/0565; H01M 2300/0065; H01M 4/485; B82Y 20/00; B82Y 30/00; B82Y 40/00; B82Y 25/00; C01G 25/00; C01G 25/02
See application file for complete search history.

(56) References Cited

U.S. PATENT DOCUMENTS

| | | | |
|---|---|---|---|
| 8,906,551 B2 | 12/2014 | Chan et al. | |
| 9,590,247 B2 | 3/2017 | Chan | |
| 9,853,324 B2 | 12/2017 | Chan et al. | |
| 10,128,488 B2 | 11/2018 | Chan | |
| 10,170,759 B2 | 1/2019 | Seo et al. | |
| 11,053,134 B2 | 7/2021 | Weller et al. | |
| 11,084,734 B2 | 8/2021 | Weller et al. | |
| 11,268,196 B2 | 3/2022 | Chan et al. | |
| 2010/0047696 A1 | 2/2010 | Yoshida et al. | |
| 2012/0196189 A1* | 8/2012 | Babic | C04B 35/632 429/321 |
| 2013/0344416 A1 | 12/2013 | Sakamoto et al. | |
| 2014/0072870 A1 | 3/2014 | Otsuka et al. | |
| 2014/0186720 A1 | 7/2014 | Kintaka | |
| 2015/0130115 A1 | 5/2015 | Sung et al. | |
| 2015/0180001 A1* | 6/2015 | Johnson | H01M 50/449 429/246 |
| 2016/0141605 A1 | 5/2016 | Chan et al. | |
| 2016/0248118 A1 | 8/2016 | Chan et al. | |
| 2016/0293988 A1 | 10/2016 | Sakamoto et al. | |
| 2017/0155169 A1 | 6/2017 | Hitz et al. | |
| 2018/0034054 A1 | 2/2018 | Chan et al. | |
| 2018/0375149 A1 | 12/2018 | Beck et al. | |
| 2019/0062176 A1 | 2/2019 | Weller et al. | |
| 2019/0337817 A1 | 11/2019 | Weller et al. | |
| 2020/0131643 A1 | 4/2020 | Chan et al. | |
| 2021/0371296 A1 | 12/2021 | Weller et al. | |
| 2021/0403340 A1 | 12/2021 | Weller et al. | |
| 2022/0186380 A1 | 6/2022 | Chan et al. | |

FOREIGN PATENT DOCUMENTS

| | | |
|---|---|---|
| CN | 104332651 A | 2/2015 |
| CN | 105406117 A | 3/2016 |
| WO | WO2013158307 | 10/2013 |
| WO | WO2013192417 | 12/2013 |
| WO | WO2014134350 | 9/2014 |
| WO | WO2014205381 | 12/2014 |
| WO | WO2015006010 A2 | 1/2015 |
| WO | WO2015038735 | 3/2015 |
| WO | WO2015006010 A9 | 7/2015 |

OTHER PUBLICATIONS

U.S. Appl. No. 62/550,155, Weller et al., filed Aug. 25, 2017.
Afyon et al. "A Shortcut to Garnet-Type Fast Li-Ion Conductors for All-Solid State Batteries". J. Mater. Chem. A 2015, 3, pp. 18636-18648.
Awaka et al. "Synthesis and Structure Analysis of Tetragonal Li7La3Zr2O12 with the Garnet-Related Type Structure". J. Solid State Chem. 2009, 182:2046-2052, https://doi.org/10.1016/j.jssc.2009.05.020.
Baek et al. "Garnet Related Lithium Ion Conductor Processed by Spark Plasma Sintering for All Solid State Batteries". J. Power Sources 2014, 249, 197-206.
Buschmann et al. "Lithium Metal Electrode Kinetics and Ionic Conductivity of the Solid Lithium Ion Conductors 'Li7La3Zr2O12' and Li7-xLa3Zr2-xTaxO12 with Garnet-Type Structure". J. Power Sources 2012, 206, 236-244.
Cassir et al. "Synthesis of $ZrO_2$ Thin Films by Atomic Layer Deposition: Growth Kinetics, Structural and Electrical Properties," Applied Surface Science, 2002, 193(1-4):120-128.

(Continued)

*Primary Examiner* — Haidung D Nguyen
(74) *Attorney, Agent, or Firm* — Fish & Richardson P.C.

(57) ABSTRACT

Nanosized cubic lithium lanthanum zirconate is synthesized by forming a solution including an organic compound and compounds of lithium, lanthanum, and zirconium; drying the solution to yield a solid; and heating the solid in the presence of oxygen to pyrolyze the organic compound to yield a product comprising nanosized cubic lithium lanthanum zirconate.

23 Claims, 8 Drawing Sheets

(56) References Cited

OTHER PUBLICATIONS

Chan et al. "Nanostructured Garnet-Type Li7La3Zr2O12 : Synthesis, Properties, and Opportunities as Electrolvtes for Li-Ion Batteries". Electrochim. Acta 2017, 253, 268-280.

Chen et al.. "Effect of a ZrO2 Coating on the Structure and Electrochemistry of LixCoO2 When Cycled to 4.5 V," Electrochem. Solid-State Lett., 2002, 5(10):A213, https://doi.org/10.1149/1.1503202.

Chen et al., "Towards Shape Control of Metal Oxide Nanocrystals in Confined Molten Media," Chem. Nano. Mat., 2015, 1(1):18-26, https://doi.org/10.1002/cnma.201500032.

Cheng et al. "Effect of surface microstructure on electrochemical performance of garnet solid electrolytes". ACS Appl. Mater. Interfaces 7, 2073-2081 (2015).

Cheng et al. "Interrelationships among Grain Size, Surface Composition, Air Stability, and Interfacial Resistance of Al-Substituted Li7La3Zr2O12 Solid Electrolytes". ACS Appl. Mater. Interfaces 2015, 7, 17649-17655.

Cho et al., "Zero-Strain Intercalation Cathode for Rechargeable Li-Ion Cell," Angew. Chemie—Int. Ed. 2001, 40(18):3367-3369, https://doi.org/10.1002/1521-3773.

Danks et al. "The evolution of 'sol-gel' chemistry as a technique for materials synthesis" Mater. Horizons 3, 91-112 (2016).

Deviannapoorani et al. "Synthesis of Garnet Structured Li7+xLa3YXZr2 XO12 (X=0-0.4) by Modified Sol-Gel Method". J. Sol-Gel Sci. Technol. 2012, 64, 510-514.

Deviannapoorani et al. "Synthesis of Lithium Garnets from La2Zr2O7 Pyrochlore," Solid State Ionics 2015, 283, 123-130.

Fang et al. "Grain growth during sintering of nanosized particles". Ceram. Trans. 209, 389-400 (2010).

Fu et al. "Flexible, solid-state, ion-conducting membrane with 3D garnet nanofiber networks for lithium batteries" PNAS, vol. 113 No. 26, Jun. 28, 2016, pp. 7094-7099.

Geiger et al. "Crystal Chemistry and Stability of "Li7La3Zr2O12" garnet: A Fast Lithium-Ion Conductor". Inorg. Chem. 2011, 50, 1089-1097.

Gordon et al. "101, Preparation of Nano- and Microstructured Garnet Li7La3Zr2O12 Solid Electrolytes for Li-Ion Batteries via Cellulose Templating". ACS Sustainable Chem. Eng. 2016, 4, 6391-6398.

Guo et al. "Molten Salt Synthesis of Different Ionic Radii Metallic Compounds Doped Lithium Titanate Used in Li-Ion Battery Anodes". Mater. Trans. 2017, 58, 383-389.

Guo et al. "Molten Salt Synthesis of Nano-Sized Li4Ti5O12 Doped with Fe2O3 for Use as Anode Material in the Lithium-Ion Battery", RSC Adv. 2014, 4, 60327-60333.

Hamalainen et al., "Lithium Phosphate Thin Films Grown by Atomic Layer Deposition." J. Electrochem. Soc., 2012, 159(3):A259-A263, https://doi.org/10.1149/2.052203jes.

Hanc et al. "On Fabrication Procedures of Li-Ion Conducting Garnets," J. Solid State Chem. 2017, 248 (Nov. 2016), 51-60.

Huang et al. "Effect of Sintering Temperature on Structure and Ionic Conductivity of Li7-xLa3Zr2O12-0.5x (x=0.5~0.7) Ceramics". Solid State Ionics 2011, 204, 41-45.

Huang et al. "Growth of Well-Developed LaOCl Microplates by Chloride Salt-Assisted Method". CrystEngComm 2017, 19, 2971-2976.

Huang et al. "Preparation of CaZrO3 Powders by a Microwave—Assisted Molten Salt Method". J. Ceram. Soc. Jpn. 2016, 124, 593-596.

Ishiguro et al. "Ta-Doped Li7La3Zr2O12 for Water-Stable Lithium Electrode of Lithium-Air Batteries". J. Electrochem. Soc. 2014, 161, A668-A674.

Janani et al. "Synthesis of cubic Li7La3Zr2O12 by modified sol-gel process". Ionics (Kiel). 17, 575-580 (2011).

Jin et al. "Al-doped Li7La3Zr2O12 synthesized by a polymerized complex method" Journal of Power Sources 196, 2011, pp. 8683-8687.

Karakaya et al., "Assembly of Molten Transition Metal Salt-Surfactant in a Confined Space for the Synthesis of Mesoporous Metal Oxide-Rich Metal Oxide-Silica Thin Films," Chem. Mater., 2011, 23(12):3062-3071, https://doi.org/10.1021/cm200932k.

Kazyak et al., "Atomic Layer Deposition of the Solid Electrolyte Garnet Li7La3Zr2O12," Chem. Mater. 2017, 29(8):3785-3792. https://doi.org/10.1021/acs.chemmater.7b00944.

Keiteb et al., "A Modified Thermal Treatment Method for the Up-Scalable Synthesis of Size-Controlled Nanocrystalline Titania," Appl. Sci., 2016, 6(295):1-10.

Kim et al. "Electrochemical Stability of Li6.5La3Zr1.5M0.5O12 (M=Nb or Ta) against Metallic Lithium. Front". Energy Res. 2016, 4.1-7.

Kim et al. "Atomic Layer Deposition of ZrO2 Thin Films with High Dielectric Constant on TiN Substrates," Electrochem. Solid-State Lett., 2008, 11(3):G9, https://doi.org/10.1149/1.2825763.

Knauth "Inorganic Solid Li Ion Conductors: An Overview". Solid State Ionics 2009, 180, 911-916.

Kokal "Solid State Electrolytes for All-Solid-State 3D Lithium-ion Batteries" Technische Universiteit Eindhoven, Jan. 1, 2012.

Kokal et al. "Sol-gel Synthesis and Lithium Ion Conductivity of Li7La3Zr2O12 with Garnet-Related Type Structure". Solid State Ionics 2011, 185,42-46.

Kozen et al., "Atomic Layer Deposition of the Solid Electrolyte LiPON," Chem. Mater., 2015, 27(15):5324-5331. https://doi.org/10.1021/acs.chemmater.5b01654.

Larraz et al. "Cubic Phases of Garnet-Type Li7La3Zr2O12: The Role of Hydration". J. Mater. Chem. A 2013, 1, 11419.

Li et al., "Significant Impact on Cathode Performance of Lithium-Ion Batteries by Precisely Controlled Metal Oxide Nanocoatings via Atomic Layer Deposition." J. Power Sources, 2014, 247:57-69, https://doi.org/10.1016/j.jpowsour.2013.08.042.

Liu et al. "Garnet-type Li6.4La3Zr1.4Ta0.6O12 thin sheet: Fabrication and application in lithium-hydrogen peroxide semi-fuel cell" Electrochemistry Communications 48, 2014, pp. 147-150.

Liu et al. "High Lithium Ionic Conductivity in the Garnet-Type Oxide Li72-XLa3Zr2-XMoXO12 (X=0-0.3) Ceramics by Sol-Gel Method". J. Am. Ceram. Soc. 2017, 100, 1527-1533.

Liu et al. "Salt Melt Synthesis of Ceramics, Semiconductors and Carbon Nanostructures," Chem. Soc. Rev., 2013, 42(21):8237, https://doi.org/10.1039/C3CS60159E.

Liu et al., "Atomic Layer Deposition of Lithium Tantaiate Solid-State Electrolytes," J. Phys. Chem. C, 2013, 117(39):20260-20267, https://doi.org/10.1021/jp4063302.

Liu et al., "Toward 3D Solid-State Batteries via Atomic Laver Deposition Approach," Front. Energy Res., Mar. 2018, 6 , 1-5. https://doi.org/10.3389/fenrg.2018.00010.

Liu et al. "Ultrathin Atomic Layer Deposited ZrO2 coating to Enhance the Electrochemical Performance of Li4Ti5O12 as an Anode Material," Electrochim. Acta., 2013. 93:195-201, https://doi.org/10.1016/j.electacta.2012.12.141.

Loho et al. "Garnet-Type Li7La3Zr2O12 Solid Electrolyte Thin Films Grown by CO2—Laser Assisted CVD for All-Solid-State Batteries," J. Electrochem. Soc., 2017, 164(1):A6131-A6139 https://doi.org/10.1149/2.0201701jes.

Long et al.. "Three-Dimensional Battery Architectures." Chem. Rev., 2004, 104:4463-4492, https://doi.org/10.1021/cr0207401.

Matsuda et al. "Phase Formation of a Garet-Type Lithium-Ion Conductor Li7-3xAlxLa3Zr2O12". Solid State Ionics 2015, 277,23-29.

Miyashiro et al., "Improvement of Degradation at Elevated Temperature and at High State-of-Charge Storage by ZrO2 Coating on LiCoO2," J. Electrochem. Soc., 2006, 153(2):A348, https://doi.org/10.1149/1.2149306.

Murugan et al., "Fast Lithium Ion Conduction in Garnet-Type Li7La3Zr2O12". Angew. Chem., Int. Ed. 2007, 46, 7778-7781. https://doi.org/10.1002/anie.200701144.

Nisula et al., "Atomic Layer Deposition of Lithium Phosphorus Oxynitride," Chem. Mater., 2015, 27(20):6987-6993, https://doi.org/10.1021/acs.chemmater.5b02199.

Ohta et al. "High Lithium Ionic Conductivity in the Garnet-Type Oxide Li7 XLa3(Zr2 X,NbX)O12 (X=0-2)". J. Power Sources 2011, 196, 3342-3345.

(56) References Cited

OTHER PUBLICATIONS

Pearse et al., "Three-Dimensional Solid-State Lithium-Ion Batteries Fabricated by Conformal Vapor-Phase Chemistry," ACS Nano, 2018, 12:4286-4294, https://doi.org/10.1021/acsnano.7b08751.

Putkonen et al., "Atomic Layer Deposition of Lithium Containing Thin Films," J. Mater. Chem., 2009, 19(46):8767, https://doi.org/10.1039/b913466b.

Putkonen et al., "ZrO2 Thin Films Grown on Silicon Substrates by Atomic Layer Deposition with Cp2Zr(CH3)2 and Water as Precursors," Chem. Vap. Depos., 2003, 9(4):207-212, https://doi.org/10.1002/cvde.200306254.

Rahman et al. "Basic Molten Salt Process—A New Route for Synthesis of Nanocrystalline Li4Ti5O12-TiO2 Anode Material for Li-Ion Batteries Using Eutectic Mixture of LiNO3-LiOH-Li2O2". J. Power Sources 2010, 195, 4297-4303.

Ramakumar et al. "Lithium Garnets: Synthesis, Structure, Li+ Conductivity, Li+ Dynamics and Applications," Prog. Mater. Sci. 2017, 88, 325-411.

Rangasamy et al. "The Role of Al and Li Concentration on the Formation of Cubic Garnet Solid Electrolyte of Nominal Composition Li7La3Zr2O12". Solid State Ionics 2012, 206, 28-32.

Reddy et al. "Molten salt synthesis and characterization of fast ion conductor Li6.75La3Zr1.75Ta0.25O12". J. Solid State Electrochem. (2017), 21, pp. 2921-2928.

Sakamoto et al. "Synthesis of Nano-Scale Fast Ion Conducting Cubic Li7La3Zr2O12". Nanotechnology 2013, 24, 42005, pp. 1-8.

Sharafi et al. "Impact of Air Exposure and Surface Chemistry on Li-Li7La3Zr2O12 Interfacial Resistance". J. Mater. Chem. A 2017, 5, 13475-13487.

Shimonishi et al "Synthesis of Garnet-Type Li7 XLa3Zr2O12-1/2x and Its Stability in Aqueous Solutions". Solid State Ionics 2011, 183,48-53.

Smolenski et al., "A Potentiometric Study of the Interaction of Zr(IV) and 0(II) Ions in the LiCl—KCl Eutectic Molten Salt," J. Electrochem. Soc., 2004, 151(9):E302, https://doi.org/10.1149/1.1779332.

Thangadurai et al. "Garnet-Type Solid-State Fast Li Ion Conductors for Li Batteries: Critical Review," Chem. Soc. Rev. 2014, 43:4714-4727, https://doi.org/10.1039/c4cs00020j.

Thompson et al. "Tetragonal vs. Cubic Phase Stability in Al-Free Ta Doped Li7La3Zr2O12 (LLZO)". J. Mater. Chem. A 2014, 2, 13431-13436.

Toda et al. "Low Temperature Cubic Garnet-Type CO2-Doped Li7La3Zr2O12". Solid State Ionics 2013, 233, 102-106.

Tsai et al. "High Conductivity of Mixed Phase Al-Substituted Li7La3Zr2O12". J. Electroceram. 2015, 35,25-32.

Van Hemmen et al., "Plasma and Thermal ALD of Al2O3 in a Commercial 200 Mm ALD Reactor," J. Electrochem. Soc., 2007, 154(7):165-169, https://doi.org/10.1149/1.2737629.

Wang et al. "Phase Transition in Lithium Garnet Oxide Ionic Conductors Li7La3Zr2O12: The Role of Ta Substitution and H2O/CO2 Exposure". J. Power Sources 2015, 275, 612-620.

Wang et al. "Preparation of Lanthanum Zirconate Nano-Powders by Molten Salts Method". J. Non-Cryst. Solids 2010, 356, 1049-1051.

Wang et al., "Atomic Layer Deposited Lithium Silicates as Solid-State Electrolytes for All-Solid-State Batteries," ACS Appl. Mater. Interfaces, 2017, 9(37):31786-31793, https://doi.org/10.1021/acsami.7b07113.

Wang et al., "Atomic Layer Deposition of Lithium Niobium Oxides as Potential Solid-State Electrolytes for Lithium-Ion Batteries," ACS Appl. Mater. Interfaces, 2018, 10(2):1654-1661, https://doi.org/10.1021/acsami.7b13467.

Weller et al. "Synthesis of Fine Cubic Li7La3Zr2O12 Powders in Molten LiCl—KCl Eutectic and Facile Densification by Reversal of Li+/H+ Exchange," ACS Appl. Energy Mater. 2018, 1, 552-560. Jan. 9, 2018.

Whetten et al., "Li7La3Zr2O12 Nanoparticles Prepared Using Molten Salt Synthesis as Ceramic Fillers in Polymer Composite Solid Electrolytes," Presented at MRS Spring Meeting & Exhibit, 2018, Phoenix, AZ, 3 pages.

Wolfenstine et al. "Synthesis and High Li-Ion Conductivity of Ga-Stabilized Cubic Li7La3Zr2)12". Mater. Chem. Phys. 2012, 134, 571-575.

Xie et al. "Low-Temperature Synthesis of Li7La3Zr2O12 with Cubic Garnet-Type Structure". Mater. Res. Bull. 2012, 47, 1229-1232.

Yang et al. "Composite Polymer Electrolytes with Li7La3Zr2O12 Garnet-Type Nanowires as Ceramic Fillers: Mechanism of Conductivity Enhancement and Role of Doping and Morphology" ACS Appl. Mater. Interfaces 2017, 9, 21773-21780, and the Supporting Information, p. S1-S15 (Year: 2017).

Yang et al. "Nanostructured Garnet-Type Solid Electrolytes for Lithium Batteries: Electrospinning Synthesis of Li7La3Zr2O12 Nanowires and Particle Size-Dependent Phase Transformation". J. Phys. Chem. C, 2015, 119(27):14947-14953.

Yi et al. "Flame Made Nanoparticles Permit Processing of Dense, Flexible, Li+ Conducting Ceramic Electrolyte Thin Films of Cubic-Li7La3Zr2O12 (c-LLZO)", J. Mater. Chem. A 2016, 4, 12947-12954.

Yi et al. "Key Parameters Governing the Densification of Cubic-Li7La3Zr2O12 Li+ Conductors". J. Power Sources 2017, 352, 156-164.

Zhang "Low Temperature Synthesis of Complex Refractory Oxide Powders From Molten Salts". J. Pakistan Mater. Soc. 2007, 1,49-53.

Zhong et al. "Layered lithium-rich oxide nanoparticles: low-temperature synthesis in mixed molten salt and excellent perfonnance as cathode of lithium-ion battery". Ionics (Kiel). (2017), 23, pp. 1955-1966.

\* cited by examiner

PREPARATION OF NANOSIZED CUBIC LITHIUM LANTHANUM ZIRCONATE FAST ION CONDUCTOR VIA FACILE POLYMER-CHELATE COMBUSTION ROUTE

CROSS-REFERENCE TO RELATED APPLICATIONS

This application is a continuation of U.S. patent application Ser. No. 16/009,518, filed on Jun. 15, 2018, which claims the benefit of U.S. Patent Application No. 62/521,051 filed on Jun. 16, 2017, both of which are incorporated by reference herein in their entirety.

STATEMENT OF GOVERNMENT INTEREST

This invention was made with government support under 1553519 awarded by the National Science Foundation. The government has certain rights in the invention.

BACKGROUND

Lithium lanthanum zirconate (LLZO) may have a cubic or tetragonal crystal structure. The cubic phase has high lithium-ion (Li-ion) conductivity, but is only thermodynamically favorable at high temperatures (>600° C.). The tetragonal phase is stable at room temperature, but has poor ionic conductivity. Currently, most LLZO is synthesized through solid state reactions, typically requiring high temperatures, repeated heat treatments, ball milling or other mixing methods, as well as carefully controlled addition of extrinsic dopants to stabilize the cubic phase at room temperature. Dopants used in these processes, however, often form impurity phases, particularly at interfaces and grain boundaries, resulting in reduced overall conductivity.

SUMMARY

Lithium lanthanum zirconate ($Li_7La_3Zr_2O_{12}$, LLZO) is a fast ion conductor for Li-ions, suitable for enhancing the energy density and safety of Li-ion batteries. Reducing the crystallite size of LLZO below a certain threshold (e.g., to nanometric dimensions) can stabilize the cubic phase at low temperatures without the use of extrinsic dopants. In addition to stabilization of the cubic crystalline phase, nanosized ceramics have some particular advantages. For example, the onset temperature of sintering is substantially lower for nanosized ceramic particles due to the relatively higher surface energy of nanoparticles compared to bulk particles. Further, smaller grain size in dense LLZO ceramics yields higher overall conductivity since Li-ion conduction is higher along grain boundaries.

In a general aspect, synthesizing nanosized cubic LLZO includes forming a solution including an organic compound and compounds of lithium, lanthanum, and zirconium. The solution is dried to yield a solid, and the solid is heated in the presence of oxygen to pyrolyze the organic compound to yield a product including nanosized cubic LLZO.

Implementations of the general aspect may include one or more of the following features.

The solution may be aqueous or non-aqueous. In some cases, the solution includes an organic solvent, such as propionic acid or dichloromethane. The organic compound includes, consists of, or consists essentially of a carbon-containing polymer, such as poly(vinylpyrrolidone), poly(vinyl alcohol), or both. In some cases, the organic compound includes tannic acid. The solution typically includes lithium, lanthanum, and zirconium in a molar ratio of about 10:3:2 or about 10.5:3:2. In some cases, lithium, lanthanum, and zirconium are present in a molar ratio of about 7:3:2 to about 11:3:2 or 14:3:2. The compounds of lithium, lanthanum, and zirconium may be salts, such as nitrate salts. In certain cases, the compounds of lithium, lanthanum, and zirconium include organic moieties, such as acetylacetonate.

Heating the solid typically includes forming a carbonaceous foam including the organic compound or a degradation product thereof. Heating the solid typically includes distributing lithium, lanthanum, and zirconium throughout the carbonaceous foam. In some cases, heating the solid includes calcining the solid.

The product is typically at least 90 wt % nanosized cubic LLZO. In some cases, the product includes a total amount of lanthanum zirconate, lanthanum oxide, and lithium zirconate of less than 5 wt %. In certain cases, the product includes less than 5 wt % of tetragonal LLZO.

Other advantages include enhanced densification and sintering properties and lower temperature preparation methods. In some implementations, the polymer-mediated synthesis described herein uses inorganic salts of lithium, lanthanum, and zirconium and commercially available non-toxic polymers to mediate the formation of nanocrystals, with water as a solvent. The synthesis is easily implemented and able to yield large amounts of LLZO from inexpensive precursors in one low-temperature drying step and one high-temperature heating step. The reaction temperature is typically several hundreds of degrees lower than solid state reactions, thereby reducing lithium volatilization and requiring less energy. Additionally, the nanosized LLZO has the advantage of easier processing due at least in part to lower sintering temperature. With respect to device fabrication, lower temperature processing may enable simpler and less costly methods, such as roll-to-roll processing.

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

Cubic lithium lanthanum zirconate (LLZO) is a fast ion conducting solid electrolyte with a high conductivity (σ~$10^{-4}$ S/cm). LLZO is chemically stable with respect to elemental lithium and is suitable as a solid electrolyte for lithium-ion batteries (LIBs), allowing pure lithium anodes and increasing the energy capacity of a lithium ion battery.

Figure 1A:
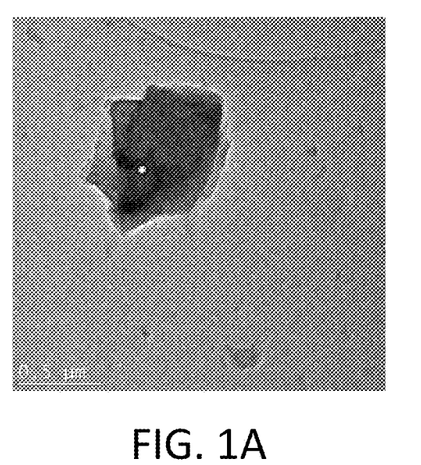
FIGS. 1A-1F shows representative transmission electron microscope (TEM) images of partially carbonized (at elevated temperature) organic material with small nanocrystals dispersed throughout.
Figure 1B:
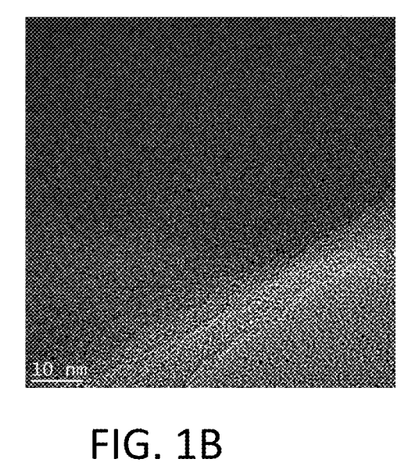
Figure 1C:
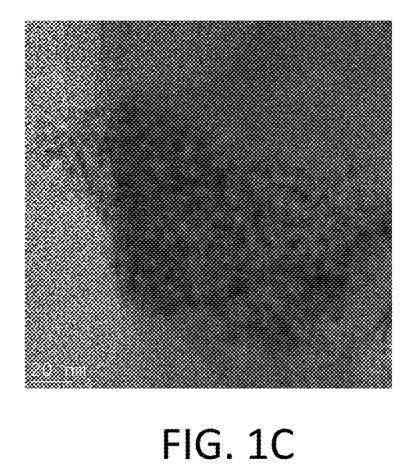
Figure 1D:
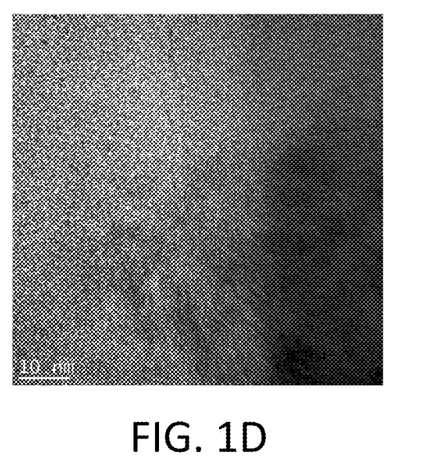
Figure 1E:
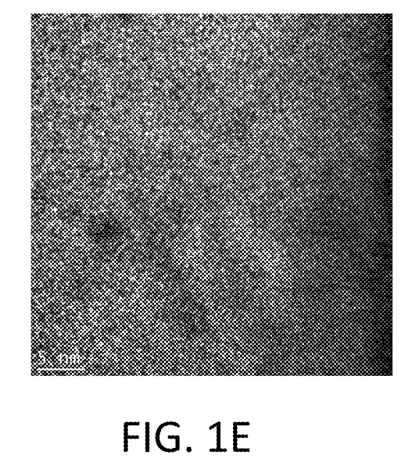
Figure 1F:
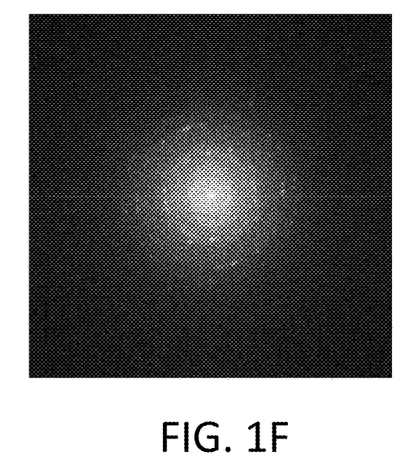

Undoped cubic LLZO ($Li_7La_3Zr_2O_{12}$) nanocrystals are synthesized in large quantities via a polymer chelate mediated route to control the final morphology of LLZO formed during combustion and calcination. In this process, a carbonaceous foam formed during pyrolysis of the polymer distributes and entraps metal containing precursors, preceramic oxidic particles, or both, inhibiting contact between metal oxide particles during crystallization (particle growth during calcination), thus restricting particle growth beyond a certain size. The foam is transient, and fully decomposes at temperatures above 500° C. Representative transmission electron microscope (TEM) images of the carbonized but not fully calcined material are shown in FIGS. 1A-1F, in which nanocrystalline material is dispersed throughout transient carbonaceous material. FIG. 1A shows an overview image of a small piece of carbonized but not fully calcined material. FIG. 1B shows a high magnification image of the amorphous carbon comprising the particle from FIG. 1A. FIG. 1C shows small particles of unknown composition dispersed in carbon. FIG. 1D shows a higher magnification image of the particles from FIG. 1C. FIG. 1E shows a high-resolution TEM image of the particles in FIGS. 1C and 1D, with the appearance of lattice fringes indicating crystallinity. In FIG. 1F, a diffractogram of the image in FIG. 1E is shown, where spots indicate crystallinity, and diffuse rings indicate amorphous material, attributed to the carbon matrix in which the nanocrystals are dispersed.

In some embodiments, a synthetic procedure for LLZO utilizes a polymer with functional groups suitable for chelation to metal cations (e.g., amide, lactam, carboxylic acid, alcohol) to form a gel-like precursor upon removal of solvent. In some embodiments, an aqueous solution of metal nitrates is prepared, followed by addition of a polymer with functional groups having free electron pairs available for chelation. An example of a suitable polymer is poly(vinylpyrrolidone). The solution is dried to yield a solid. Upon drying (i.e., removing the solvent, such as water), the metal salts do not precipitate, but rather are bound to the polymer backbone. Drying is typically achieved by heating at a temperature between room temperature and 250° C. for a length of time from 1 to 24 hours. The dried polymer is a somewhat rigid gel-like material, with no visual indication of precipitated metal species.

The polymeric precursor may be heat treated through one or several stages to pyrolyze, and substantially remove, all organic species through thermal oxidation. Pyrolization (or calcination) is typically achieved by heating at temperatures with a maximum temperature between 650° C. and 800° C. The total heating time may vary, but a length of time at the maximum temperature is typically in a range of 0.5 h to 4 h. As the polymer is pyrolyzed, the functional groups are consumed or destroyed, and thus no longer bind the metal cations. The heat treatment, conducted in air, is thought to initiate metal oxide formation. While a range of heating schedules result in the desired cubic LLZO phase, deviation from this range can result in impurity phases such as lanthanum zirconate ($La_2Zr_2O_7$, LZO), lanthanum oxide ($La_2O_3$), one of several types of lithium zirconate ($Li_xZr_yO_z$), and tetragonal LLZO. In some cases, deviation from this range results in lack of formation of any cubic LLZO at all. The resulting pyrolyzed carbonaceous material, while no longer binding metal cations, is still present and has the effect of sequestering the growth of metal oxides, as seen in FIGS. 1A-1F. The final product of this method is a pure metal oxide composed of nanometric crystallites (at least 90 wt % cubic LLZO), with some degree of sintering depending on reaction time, rather than a bulk or polydisperse powder. Any amorphous material present is believed to be a surface layer of lithium carbonate ($Li_2CO_3$), formed on the surface when exposed to air for an extended length of time. The final product typically contains less than 5 wt % of lanthanum zirconate, lanthanum oxide, and lithium zirconate (combined) and less than 5 wt % tetragonal LLZO.

In a typical synthesis of cubic LLZO particles, lithium nitrate, lanthanum nitrate, and zirconium oxynitrate are dissolved in water in a molar ratio of 10.5:3:2, respectively. A small amount of acetic acid may be added to aid in dissolution of zirconium oxynitrate. Once the metal salts are dissolved to yield a metal salt solution, an amount of polymer is dissolved in the metal salt solution to yield a precursor solution. An example of a suitable polymer is poly(vinylpyrrolidone). The amount of polymer is selected such that there is at least one functional group on the polymer backbone per metal cation in solution. However, the amount of polymer may be varied to control the final morphology of nanocrystals. The precursor solution is stirred for several hours and then dried at an elevated temperature (e.g., above 150° C.). The resultant dried material, partially oxidized, may be calcined (e.g., at 800° C. for a few hours) to yield cubic LLZO nanocrystals. While alumina crucibles are frequently used, Energy Dispersive X-Ray Spectroscopy (EDS) confirms that no appreciable amount of aluminum diffuses from the crucible to the LLZO ceramic such that doping could stabilize the cubic phase. Further, extending the calcination time typically results in the formation of tetragonal LLZO, which occurs in undoped LLZO once the particle size grows beyond a certain critical threshold. In this process, 50 to 100 milliliters of precursor solution typically yields several hundred milligrams of cubic LLZO.

In some embodiments, an extrinsic dopant is added to the precursor solution to yield nanosized doped LLZO. Suitable dopants include salts or other precursors of alkalis (e.g., barium), metals (e.g., aluminum), or transition metals (e.g., tantalum).

In methods described herein, gelation is not required or desired to yield the nanosized cubic LLZO, at least because gelation involves the formation of metal-oxide-metal bonds between the precursor species, which may promote the formation of linked oxide particles rather than discrete particles that are entrapped in the carbonaceous foam matrix. Rather than forming a gel network in solution, the polymer acts as a material in which to homogeneously disperse the metal-containing precursors (either by chelation to metal cations or simply physical entrapment into the polymer network) after the solvent is removed through drying. This drying can occur under ambient conditions or at elevated temperature, under reduced pressure, under an inert atmosphere, or any combination of these.

Example 1: Synthesis of Cubic LLZO Nanocrystals in an Aqueous-Based Polymer Method Using Poly(Vinyl Alcohol) (PVA) or Poly(Vinylpyrrolidone) (PVP)

$LiNO_3$, $La(NO_3)_3$, and $ZrO(NO_3)_2$ were dissolved in 120 mL of de-ionized water (e.g., 120 mL) in a molar ratio of 10.5:3:2. In this molar ratio, there was a 50% molar excess of lithium based on the nominal composition of LLZO ($Li_7La_3Zr_2O_{12}$). Acetic acid (e.g., 1 mL) was added to promote dissolution. To the aforementioned acidic metal nitrate solution, the desired amount of PVA or PVP (e.g. 6 grams) was added. The solution was stirred to dissolve the metal salts and polymer, optionally at elevated temperature, yielding a viscous, pale yellow, transparent solution. The solution may be stored at least one week before use.

Figure 2:
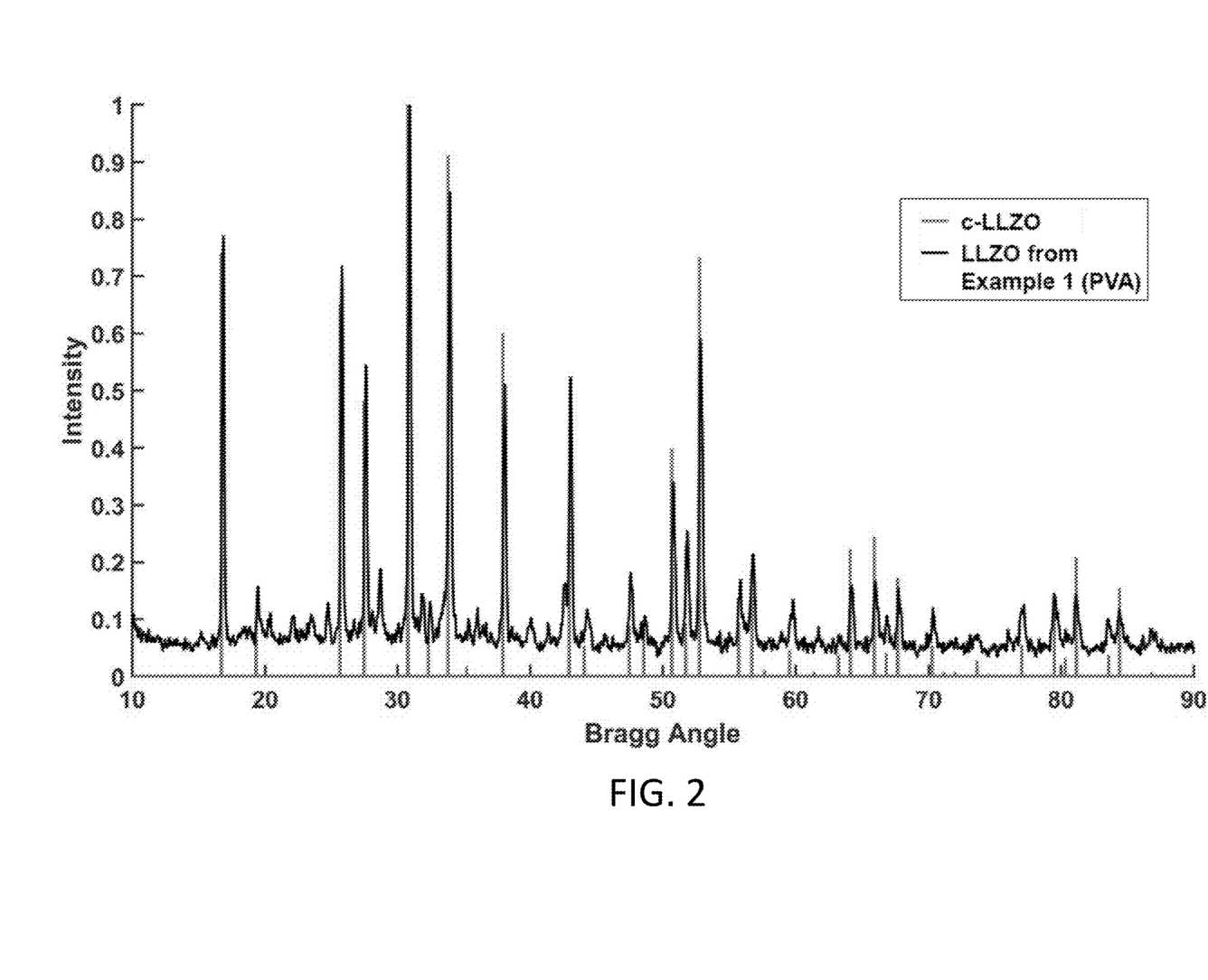
FIG. 2 shows an X-ray diffraction (XRD) pattern of the LLZO of Example 1.
Figure 3A:
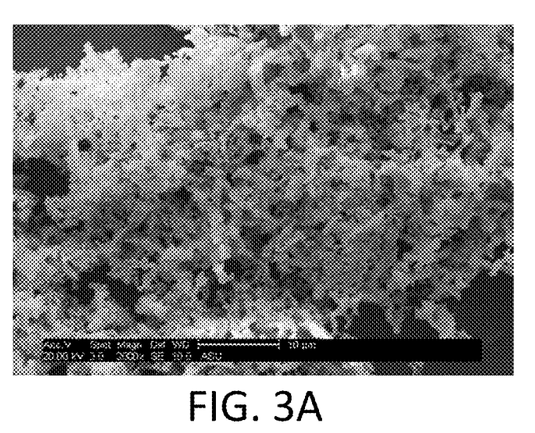
FIGS. 3A-3C show scanning electron microscope (SEM) images of the as-synthesized LLZO of Example 1.
Figure 3B:
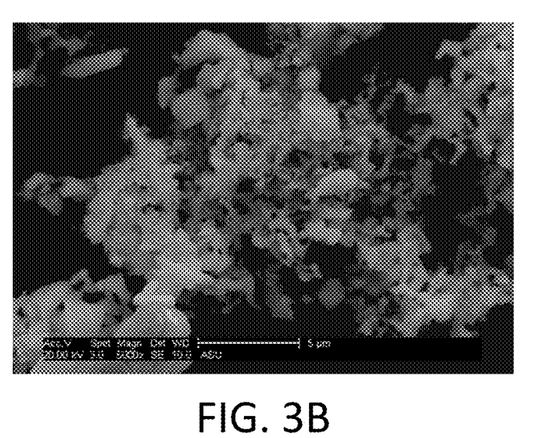
Figure 3C:
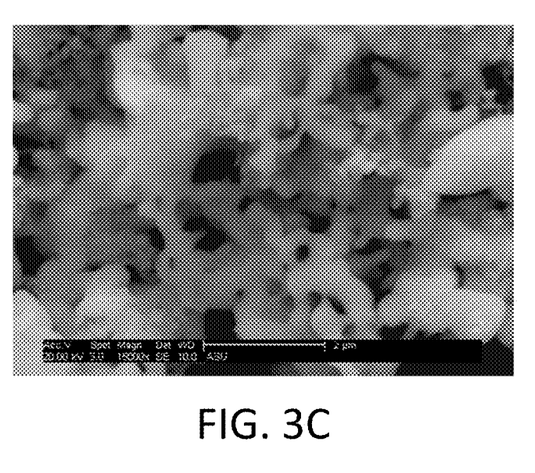

The viscous solution was dried at elevated temperature (e.g., 130° C.), resulting in a brittle, yellow-orange transparent solid. No evidence of precipitation of the metal salts was seen in this solid or at any time during drying from solution, indicating that the metal cations were chelated by or at least physically entrapped by the polymer. This dried solution may either be directly subjected to calcination, or optionally crushed (e.g., by a mortar and pestle) before calcination. The as-dried solids were calcined at high temperature in air or another suitable oxidizing atmosphere composition to simultaneously induce crystallization of the pre-ceramic oxidic material and thermally oxidize the polymer into a carbonaceous foam, followed by complete oxidation to $CO_2$ and possibly other gases. Various temperatures and calcination schemes (including ramping and holding at various temperatures for various times) may be used. In one example, the brittle dried polymer solid was subjected to calcination in an alumina or other ceramic crucible with a ramp from room temperature to 800° C. over the course of one hour, followed by holding at 800° C. for 2 hours, and subsequent cooling under ambient conditions to room temperature. The product is a fluffy white or slightly off-white powder that crushes easily with a mortar and pestle and exhibits an X-ray diffraction (XRD) pattern matching that of cubic LLZO. FIG. 2 shows an XRD pattern of nanosized cubic LLZO synthesized according to this example with PVA, along with an XRD pattern of pure cubic LLZO for reference (extending from the x axis at Intensity=0). FIGS. 3A-3C show representative scanning electron microscope (SEM) images of the material formed according to Example 1. The scale bars in FIGS. 3A-3C are 10 µm, 5 µm, and 2 µm, respectively. Other ramp rates and hold times yield similar results.

Figure 4:
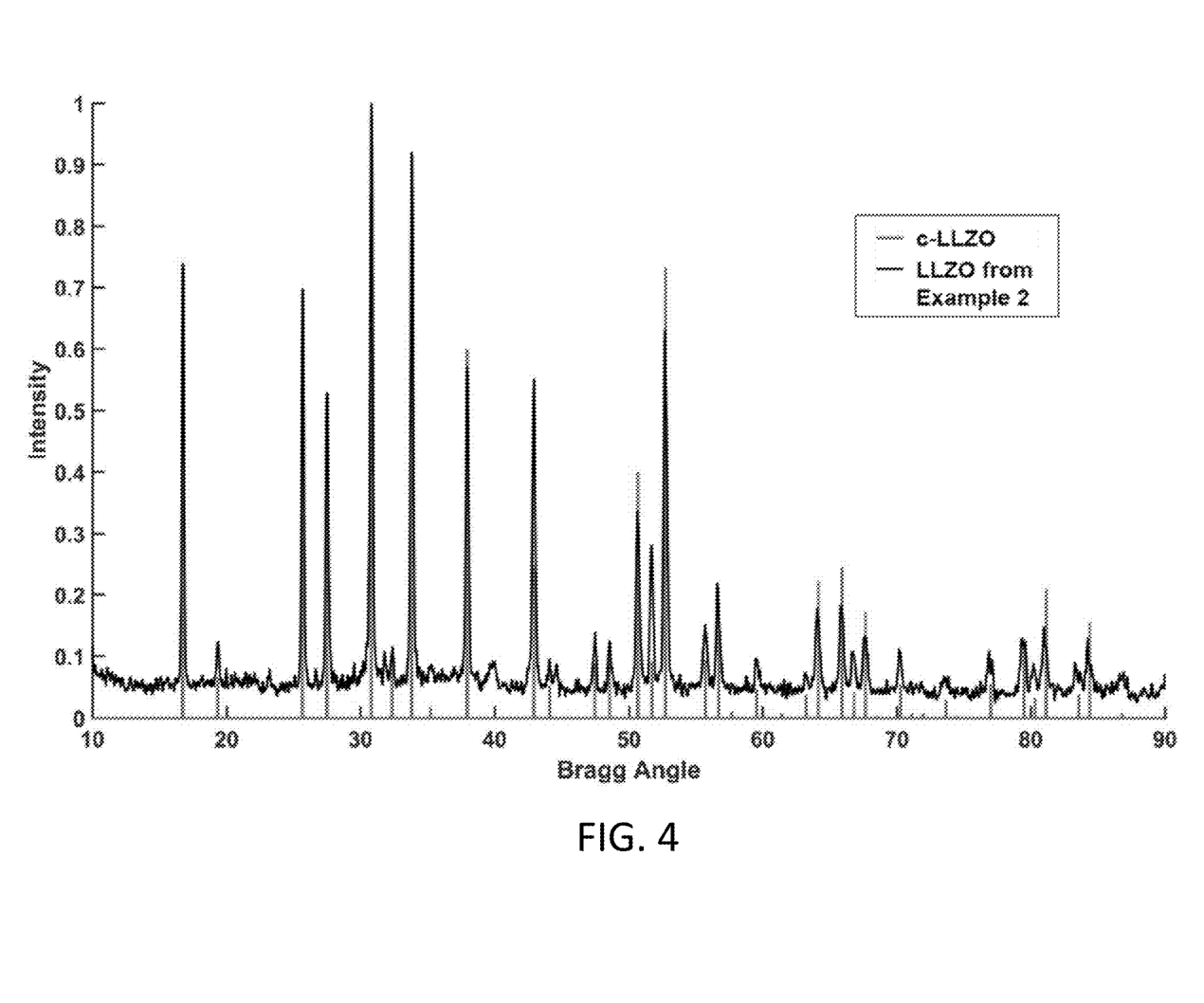
FIG. 4 shows an X-ray diffraction pattern of the LLZO of Example 2.
Figure 5:
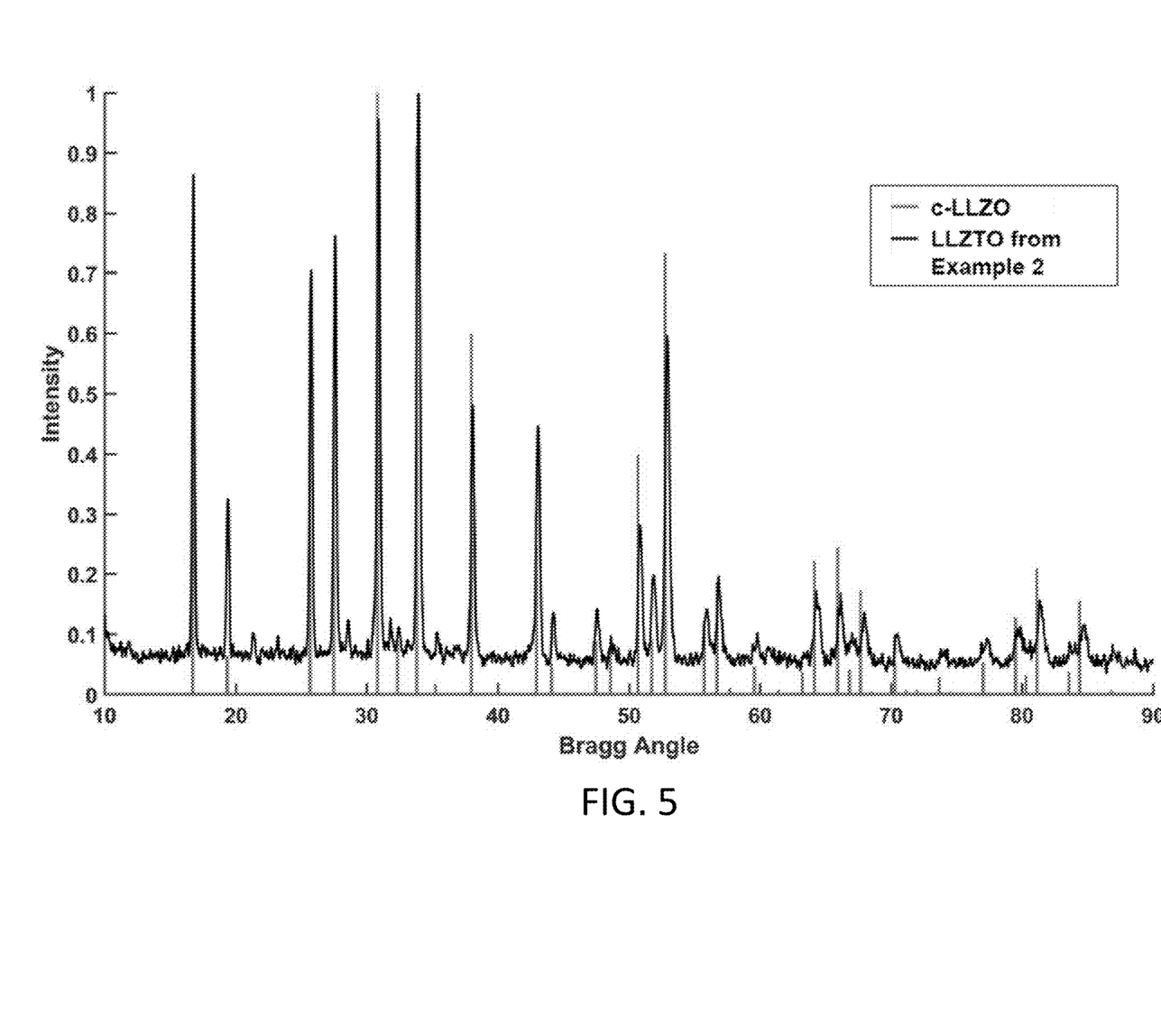
FIG. 5 shows an X-ray diffraction pattern of the LLZTO of Example 2.
Figure 6A:
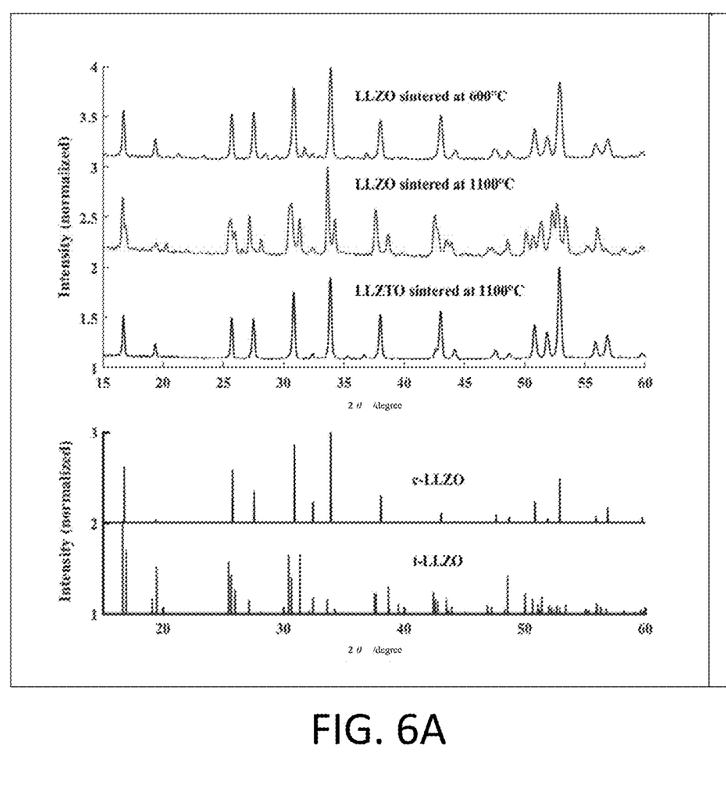
FIGS. 6A-6C show X-ray diffraction patterns comparing undoped LLZO and Ta-doped LLZTO pellets sintered under various conditions of Example 2.
Figure 6B:
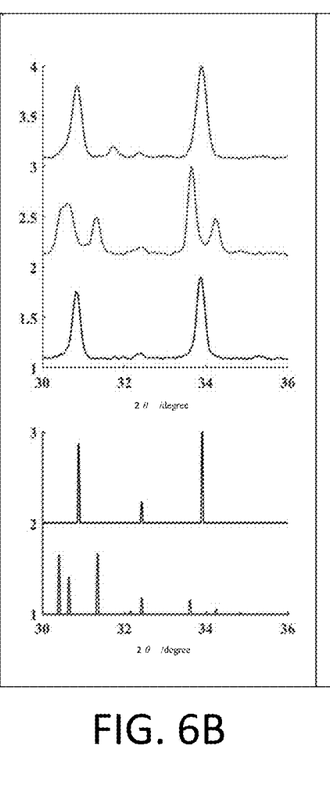
Figure 6C:
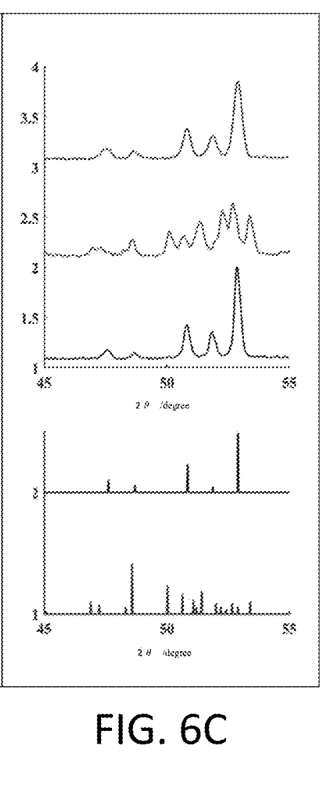
Figure 7A:
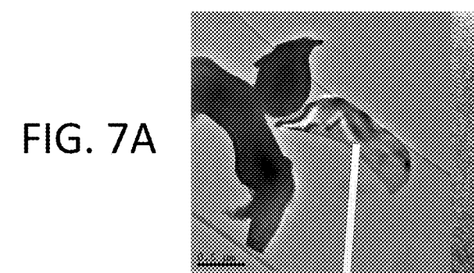
FIGS. 7A-7D show TEM images of the as-synthesized LLZO of Example 2.
Figure 7B:
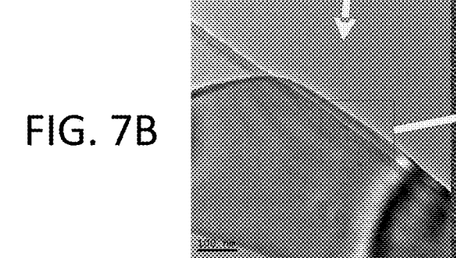
Figure 7C:
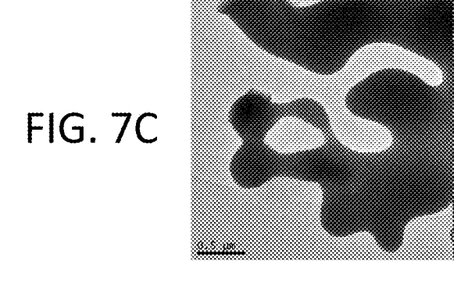
Figure 7D:
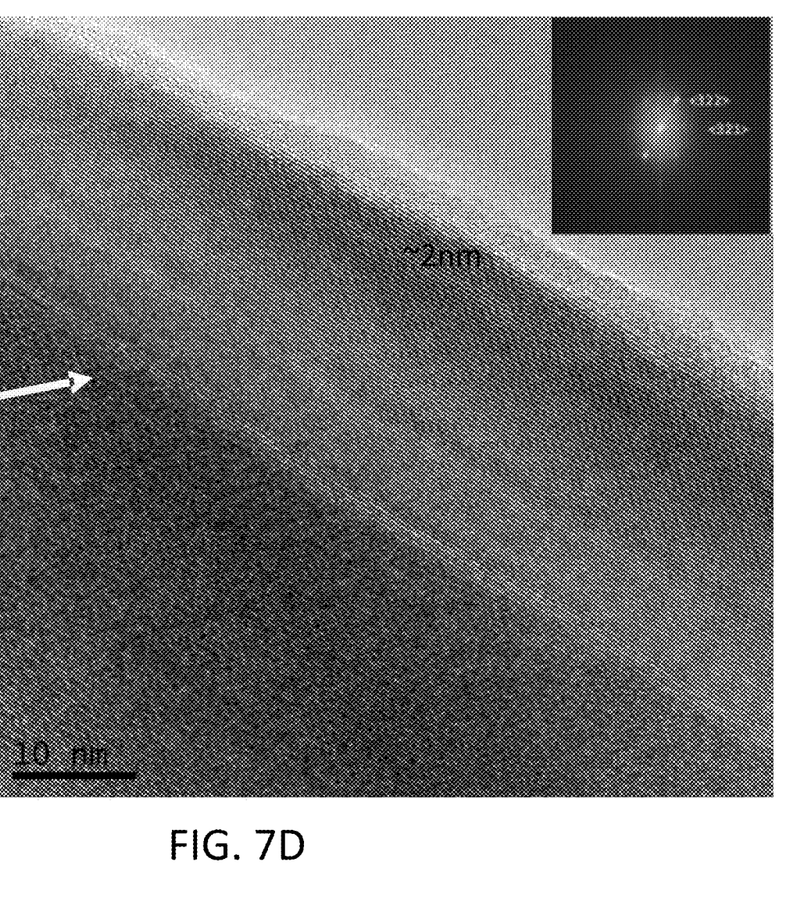

Example 2: Synthesis of Cubic LLZO Nanocrystals in a Non-Aqueous-Based Polymer Method Using Metal Acetylacetonate Precursors and Excess Carboxylic Acid 1.0875 g Li(acac) (acac=acetylacetonate or 2,4-pentanedionate), 1.3063 g La(acac)$_3$, and 0.9848 g Zr(acac)$_4$ were added in a molar ratio of Li:La:Zr 10.5:3:2 to 50 mL of propionic acid under stirring. This mixture was brought to a boil (propionic acid boiling point=141.2° C.) and subsequently removed from heat and cooled once boiling started, resulting in a yellow-orange transparent solution. This solution was subsequently diluted with 50 mL dichloromethane (DCM), though other suitable solvents may also be used. Poly(vinylpyrrolidone) (e.g., 3 g) was added and dissolved at slightly elevated temperature. Similar to the aqueous method, this solution may be stored for at least one week before use. Once a solution is obtained and cooled, it may be dried or directly subjected to a calcination procedure in an alumina or other ceramic crucible. In one example, the following heating schedule is used to produce phase-pure cubic LLZO:
  Ramp to 130° C. in 10 min
  Hold at 130° C. for 1 h
  Ramp to 800° C. in 0.5 h
  Hold at 800° C. for 0.5 h
  Cool under ambient conditions to room temperature The material obtained from this method was a fluffy white or slightly off-white powder that crushed easily with a mortar and pestle and exhibited an XRD pattern matching that of cubic LLZO. FIG. 4 shows an XRD pattern of nanosized cubic LLZO synthesized according to this example, along with a pattern of pure cubic LLZO for reference (extending from the x axis at Intensity=0). Other ramp rates and hold times yield similar results. Optionally, an aliovalent dopant such as tantalum may be added in the form of a metal organic precursor such as tantalum (V) ethoxide along with metal acetylacetonates. In this case, Ta-doped LLZO (LLZTO) results. FIG. 5 shows an XRD pattern of nanosized cubic LLZTO, along with a pattern of pure cubic LLZO for reference (extending from the x axis at Intensity=0). FIG. 6A shows XRD spectra of sintered pellets of undoped LLZO processed at 600° C. and 1100° C., and LLZTO processed at 1100° C., along with patterns of cubic LLZO and tetragonal LLZO for reference. FIGS. 6B and 6C show enlarged portions of FIG. 6A. If undoped LLZO synthesized according to Example 2 is heated at high enough temperatures such that particles coarsen, it converts to tetragonal LLZO, indicating a size-stabilization effect of the as-synthesized powder. Conversely, LLZTO maintains the cubic phase after an identical heat treatment. FIGS. 7A-7D show representative TEM images of as-synthesized LLZO according to Example 2. FIG. 7A shows a particle agglomeration and a plate-like particle. FIG. 7B shows a higher magnification image of the plate-like particle, with FIG. 7D showing a yet higher magnification image and a diffractogram in the inset indicating several crystal planes of LLZO. A roughly 2 nm thick layer of amorphous material (most likely $Li_2CO_3$) can be seen as well. FIG. 7C shows a different particle consisting of several crystal nuclei that are partially fused together. The scale bars in FIGS. 7A-7D are 0.5 µm, 100 nm, 0.5 µm, and 10 nm, respectively.

Figure 8:
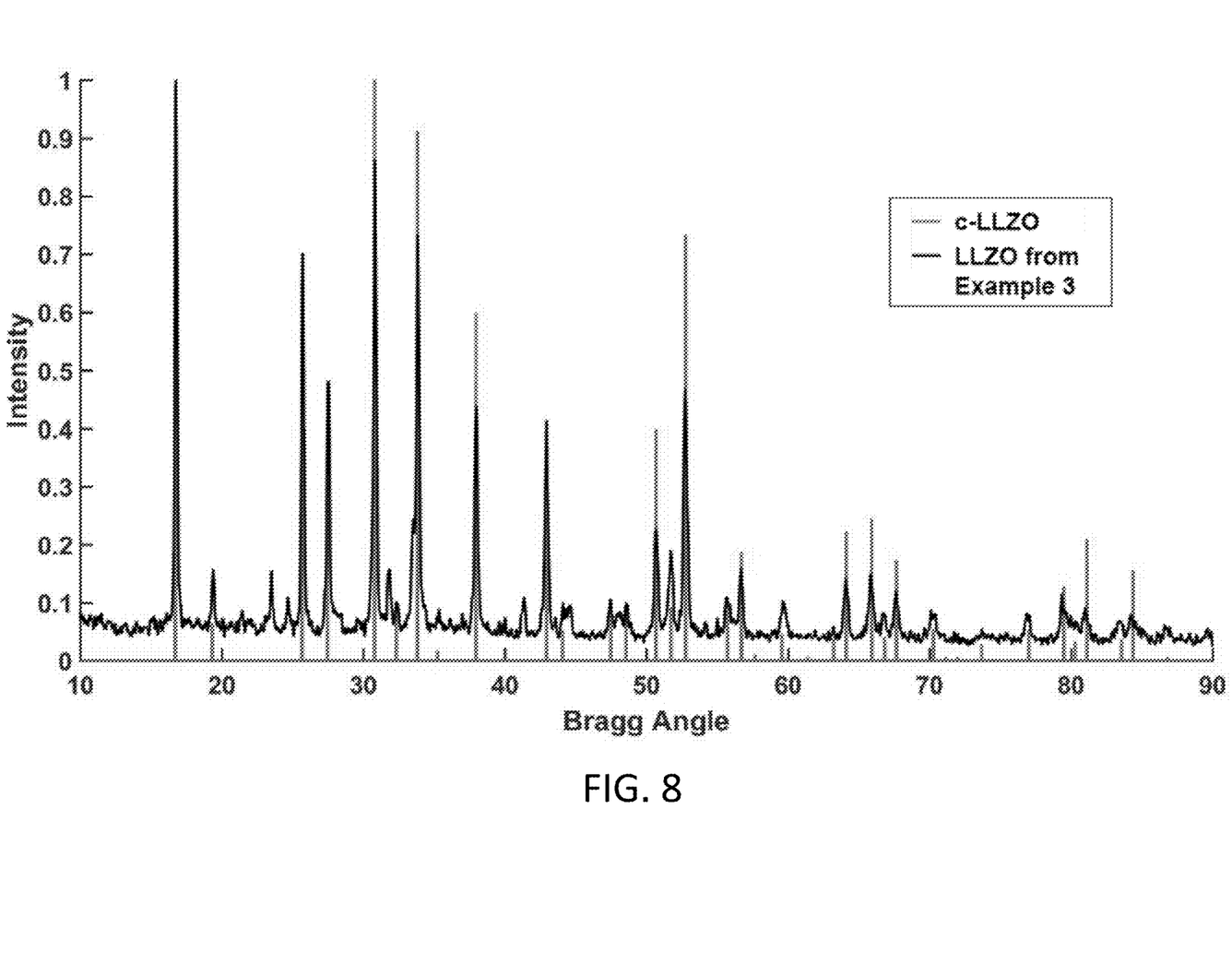
FIG. 8 shows an X-ray diffraction pattern of the LLZO of Example 3.

Example 3: Synthesis of Cubic LLZO Nanocrystals in an Aqueous-Based Tannic Acid Method 0.657 g LiNO$_3$, 1.17 g La(NO$_3$)$_3$, and 0.576 g ZrO(NO$_3$)$_2$ in a molar ratio of Li:La:Zr 10.5:3:2 were dissolved in de-ionized water, resulting in a solution with 0.3 M total dissolved metal salts. Subsequently, 12 mL of 0.05 M tannic acid (aqueous) was added under stirring, resulting in a tan colored milky suspension. This suspension was directly added to an alumina crucible, and subjected to the following heating schedule:
  Ramp to 130° C. in 10 min
  Hold at 130° C. for 4 h
  Ramp to 700° C. in 1 h
  Hold at 700° C. for 1.5 h
  Cool under ambient conditions to room temperature The material obtained from this method was a fluffy white or slightly off-white powder that crushed easily with a mortar and pestle and exhibited an XRD pattern matching that of cubic LLZO. FIG. 8 shows an XRD pattern of nanosized cubic LLZO synthesized according to this example, along with a pattern of pure cubic LLZO for reference (extending from the x axis at Intensity=0). Other ramp rates and hold times yield similar results.

In the synthetic methods described herein, dopants may be added to yield nanometric doped cubic LLZO, with substantially similar size distribution and morphology as the undoped cubic LLZO. For example, in Example 2, tantalum (V) ethoxide may be added in a mole ratio such that the nominal composition of the doped LLZTO is $Li_{(7-x)}La_3Zr_{(2-x)}Ta_xO_{12}$, where the value of 'x' is great enough that the cubic phase of LLZO is stabilized (generally 'x' between 0.25-0.6 or preferably between 0.4-0.6).

Only a few implementations are described and illustrated. Variations, enhancements and improvements of the described implementations and other implementations can be made based on what is described and illustrated in this document.

What is claimed is:

1. A method of synthesizing cubic lithium lanthanum zirconate nanoparticles, the method comprising:
    forming a solution comprising an organic compound and compounds of lithium, lanthanum, and zirconium, wherein the organic compound is poly(vinyl alcohol);
    heating the solution to yield a solid; and
    calcining the solid in the presence of oxygen to pyrolyze the organic compound to yield a product comprising cubic lithium lanthanum zirconate nanoparticles, wherein heating the solution comprises drying the solution above 150° C.

2. The method of claim 1, wherein calcining the solid comprises forming a carbonaceous foam comprising the poly(vinyl alcohol) or a degradation product thereof.

3. The method of claim 2, wherein calcining the solid comprises distributing lithium, lanthanum, and zirconium throughout the carbonaceous foam.

4. The method of claim 1, wherein the solution comprises lithium, lanthanum, and zirconium in a molar ratio of about 10:3:2.

5. The method of claim 1, wherein the solution comprises lithium, lanthanum, and zirconium in a molar ratio of about 10.5:3:2.

6. The method of claim 1, wherein the compounds of lithium, lanthanum, and zirconium are nitrate salts.

7. The method of claim 1, wherein the compounds of lithium, lanthanum, and zirconium include organic moieties.

8. The method of claim 7, wherein the compounds of lithium, lanthanum, and zirconium include acetylacetonate.

9. The method of claim 1, wherein the solution is aqueous or non-aqueous.

10. The method of claim 9, wherein the solution further comprises an organic solvent.

11. The method of claim 10, wherein the organic solvent comprises propionic acid or dichloromethane.

12. The method of claim 1, wherein the product comprises at least 90 wt % of the cubic lithium lanthanum zirconate nanoparticles.

13. The method of claim 1, wherein the product comprises a total amount of lanthanum zirconate, lanthanum oxide, and lithium zirconate of less than 5 wt %.

14. The method of claim 1, wherein the product comprises less than 5 wt % of tetragonal lithium lanthanum zirconate.

15. The method of claim 1, wherein the solution further comprises acetic acid.

16. The method of claim 1, wherein the solution further comprises an additional metal.

17. The method of claim 16, wherein the additional metal comprises a transition metal.

18. The method of claim 16, wherein the additional metal comprises aluminum.

19. The method of claim 16, wherein the additional metal comprises an alkali metal.

20. The method of claim 1, wherein heating the solution occurs under reduced pressure, under an inert atmosphere, or both.

21. The method of claim 1, wherein synthesizing the cubic lithium lanthanum zirconate nanoparticles occurs in the absence of gellation.

22. A method of synthesizing cubic lithium lanthanum zirconate nanoparticles, the method comprising:
    forming a solution comprising an organic compound and compounds of lithium, lanthanum, and zirconium, wherein the organic compound is poly(vinyl alcohol),
    heating the solution to yield a solid, and
    calcining the solid in the presence of oxygen to pyrolyze the organic compound to yield a product comprising cubic lithium lanthanum zirconate nanoparticles,
    wherein heating the solution comprises heating to a temperature in a range of room temperature to 250° C. for a length of time in a range of 1 to 24 hours.

23. A method of synthesizing cubic lithium lanthanum zirconate nanoparticles, the method comprising:
    forming a solution comprising an organic compound and compounds of lithium, lanthanum, and zirconium, wherein the organic compound is poly(vinyl alcohol),
    heating the solution to yield a solid, and
    calcining the solid in the presence of oxygen to pyrolyze the organic compound to yield a product comprising cubic lithium lanthanum zirconate nanoparticles,
    wherein heating the solution comprises ramping a temperature of the solution to 130° C.

* * * * *